(12) United States Patent
Norcott (10) Patent No.: US 7,647,354 B2
(45) Date of Patent: *Jan. 12, 2010

(54) HIGH-PERFORMANCE CHANGE CAPTURE FOR DATA WAREHOUSING

(75) Inventor: William D. Norcott, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 10/435,703

(22) Filed: May 12, 2003

(65) Prior Publication Data

US 2003/0225798 A1 Dec. 4, 2003

Related U.S. Application Data

(60) Provisional application No. 60/383,387, filed on May 24, 2002.

(51) Int. Cl.
*G06F 17/30* (2006.01)

(52) U.S. Cl. ........................ 707/200; 707/202
(58) Field of Classification Search ................ 707/1–5, 707/100, 102, 201, 202, 204; 703/23; 705/1, 705/4; 711/202
See application file for complete search history.

(56) References Cited

U.S. PATENT DOCUMENTS

| | | | | |
|---|---|---|---|---|
| 5,204,958 A | * | 4/1993 | Cheng et al. ................ | 707/102 |
| 5,280,612 A | | 1/1994 | Lorie et al. | |
| 5,301,288 A | * | 4/1994 | Newman et al. ............ | 711/202 |
| 5,553,279 A | | 9/1996 | Goldring | |
| 5,581,750 A | * | 12/1996 | Haderle et al. .............. | 707/202 |
| 5,664,160 A | * | 9/1997 | Fecteau et al. ................ | 703/23 |
| 5,727,196 A | * | 3/1998 | Strauss et al. .................. | 707/2 |
| 5,745,894 A | * | 4/1998 | Burrows et al. ................ | 707/5 |
| 5,848,405 A | * | 12/1998 | Norcott ........................ | 707/1 |
| 5,926,819 A | | 7/1999 | Doo et al. | |
| 5,963,959 A | | 10/1999 | Sun et al. | |
| 6,047,284 A | * | 4/2000 | Owens et al. .................. | 707/4 |
| 6,092,086 A | * | 7/2000 | Martin et al. ............... | 707/202 |
| 6,125,360 A | | 9/2000 | Witkowski et al. | |

(Continued)

FOREIGN PATENT DOCUMENTS

JP 03-122729 5/1991

(Continued)

OTHER PUBLICATIONS

White, Daniel; Oracle 9i, ETL from the Database Out for Free; www.innovative-consult.com; Jan. 2002; pp. 1-13, (Jan. 2002); USA.

(Continued)

*Primary Examiner*—Neveen Abel Jalil
*Assistant Examiner*—Farhan M Syed
(74) *Attorney, Agent, or Firm*—Hanify & King, P.C.

(57) ABSTRACT

A method and software for change data capture is described, in which change data is extracted from a recovery log in a single pass and stored into multiple database objects, such as change tables. The change data indicates modifications that has been performed to multiple source objects that correspond to the multiple database objects. In a preferred embodiment, this can be accomplished with a single multi-table insert SQL statement.

8 Claims, 5 Drawing Sheets

U.S. PATENT DOCUMENTS

| | | | |
|---|---|---|---|
| 6,161,103 A * | 12/2000 | Rauer et al. | 707/4 |
| 6,205,451 B1 * | 3/2001 | Norcott et al. | 707/204 |
| 6,334,128 B1 * | 12/2001 | Norcott et al. | 707/5 |
| 6,438,538 B1 * | 8/2002 | Goldring | 707/3 |
| 6,453,314 B1 * | 9/2002 | Chan et al. | 707/3 |
| 6,460,027 B1 * | 10/2002 | Cochrane et al. | 707/2 |
| 6,532,479 B2 * | 3/2003 | Souder et al. | 707/201 |
| 7,076,508 B2 * | 7/2006 | Bourbonnais et al. | 707/202 |
| 2002/0165724 A1 * | 11/2002 | Blankesteijn | 705/1 |
| 2002/0188484 A1 * | 12/2002 | Grover et al. | 705/4 |
| 2003/0204514 A1 * | 10/2003 | Owens et al. | 707/100 |
| 2003/0204540 A1 | 10/2003 | Rielau et al. | |
| 2005/0071348 A1 * | 3/2005 | Laicher et al. | 707/100 |

FOREIGN PATENT DOCUMENTS

| | | |
|---|---|---|
| JP | 11-327988 | 11/1999 |
| WO | WO 02/095632 | 11/2002 |
| WO | WO 03/096227 | 11/2003 |

OTHER PUBLICATIONS

Anonymous; Oracle Warehouse Builder: A Technical Overwiew; An Oracle Technical White Paper; Feb. 2000; pp. 1-21, USA.

Chaudhuri S et al.; An Overview of Data Warehouseing and OLAP Technology: Sigmod Record; Mar. 1997; abstract, pp. 65-74; vol. 26, No. 1 (Mar. 1997); ISSN: 0163-5808; Sigmod, New York, NY.

Barclay et al.; Loading Databases Using Dataflow Parallelism; Sigmod Record, Association for Computing Machinery; Dec. 31, 1994; pp. 72-83, abstract, figures 4, 8; vol. 23, No. 4, (Dec. 31, 1994); New York, NY.

Bello at al.; Materialized Views in Oracle; Proceedings of the 24$^{th}$ VLDB Conference; 1998; pp. 659-664; Oracle Corporation; Redwood Shores, CA.

Notice of Grounds of Rejection dated Apr. 14, 2009.

* cited by examiner

HIGH-PERFORMANCE CHANGE CAPTURE FOR DATA WAREHOUSING

The present application claims the benefit of U.S. Provisional Patent Application Ser. No. 60/383,387 filed on May 24, 2002.

RELATED APPLICATIONS

The present application is related to U.S. patent application Ser. No. 09/863,419 entitled ASYNCHRONOUS CHANGE CAPTURE FOR DATA WAREHOUSING filed on May 24, 2001 by William D. Norcott, the contents of which are hereby incorporated by reference.

FIELD OF THE INVENTION

The present invention relates to database systems and more particularly to high-performance change capture for data warehousing.

BACKGROUND OF THE INVENTION

Many businesses and other large organizations today use relational database management systems known as on-line transaction processing (OLTP) systems to execute and keep track of business transactions. For example, a company that sells products or services over the Internet may use an OLTP system to record pricing information about each product for sale, billing and shipping information for each purchaser, and sales information for each order made by a purchaser. Other examples of businesses that use OLTP systems include airlines, banks, mail-order companies, supermarkets, and manufacturers.

The data generated and recorded in OLTP systems are valuable to most businesses, because the businesses can aggregate and analyze the data to ascertain the product sales for a particular month, forecast changing trends in product popularity and identify profitable or unprofitable product lines, or otherwise evaluate the businesses' affairs. Aggregating and analyzing this data, however, is computationally expensive and, if performed on the OLTP system itself, would decrease the performance of the OLTP system. Accordingly, it has become common for businesses with OLTP systems to set up a separate computer system, generally known as a "data warehouse," for the purpose of collecting, aggregating, and analyzing the information contained in the OLTP databases. Data warehouses can grow very large, ranging from gigabytes to many terabytes of data (trillions of bytes). The task of moving data from its original source in OLTP systems to the data warehouse is commonly referred to as data extraction, transport, and loading (ETL).

Conventional data extraction, transport, and loading mechanisms are cumbersome. In a typical approach, database administrators generally dump the entire contents of the tables in the OLTP system into flat files, transport the flat files to a staging system, and then load the data in the flat files into the data warehouse. In this approach, the amount of data extracted, transported, and loaded is as immense as the amount of data in the OLTP system, even though only a small percentage of the data on the OLTP system is actually new. Accordingly, there has been much interest in devising ways to reduce the amount of data extracted, transported, and loaded by capturing only the changed data to the database tables of the OLTP system.

Lately, there has been interest in an asynchronous change capture approach for extracting, transporting, and loading data from an OLTP system to a data warehouse. In one asynchronous approach, change data in the form of inserted, updated, and deleted records are captured in recovery logs that are generated by the OLTP system in the normal course of operation. These recovery logs are shipped to the data warehouse, where the change data stored in the recovery logs can be extracted into change tables on the data warehouse without affecting the performance of the OLTP system. Each change table corresponds a source table on the OLTP system and can be used to track historical business data and provide a history of the system by identifying which records in the corresponding source table were updated.

However, there is still a need for high-performance data extracting, transport, and loading on the data warehouse side. For example, in one implementation of an asynchronous change capture needed about 8 hours and 11 minutes to extract changes from a recovery log into 12 different change tables.

SUMMARY OF THE INVENTION

The present invention stems from the recognition that a major source of delay in asynchronous change capture occurs each time when data is extracted from the recovery log. In certain implementations, a separate Structured Query Language (SQL) statement is used to extract the change data in the recovery log for each individual change table, i.e. one SQL statement per change table, and there may be dozens of change tables since each change table corresponds to a source table on the OLTP system. Accordingly, the need for high performance among other needs is addressed by the present invention, by extracting the change data from the recovery log in a single pass over the disk but storing the extracted change data in multiple tables. This approach reduces the time to process change data from a recovery log for 12 change tables from about 8 hours 11 minutes to just 45 minutes.

Accordingly, one aspect of the invention relates to software and a method for change data capture, in which change data is extracted from a recovery log in a single pass and stored into multiple database objects, such as change tables. The change data indicates modifications that has been performed to multiple source objects that correspond to the multiple database objects. In a preferred embodiment, this can be accomplished with a single multi-table insert SQL statement.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for high-performance change capture are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

Architectural Overview

Figure 1:
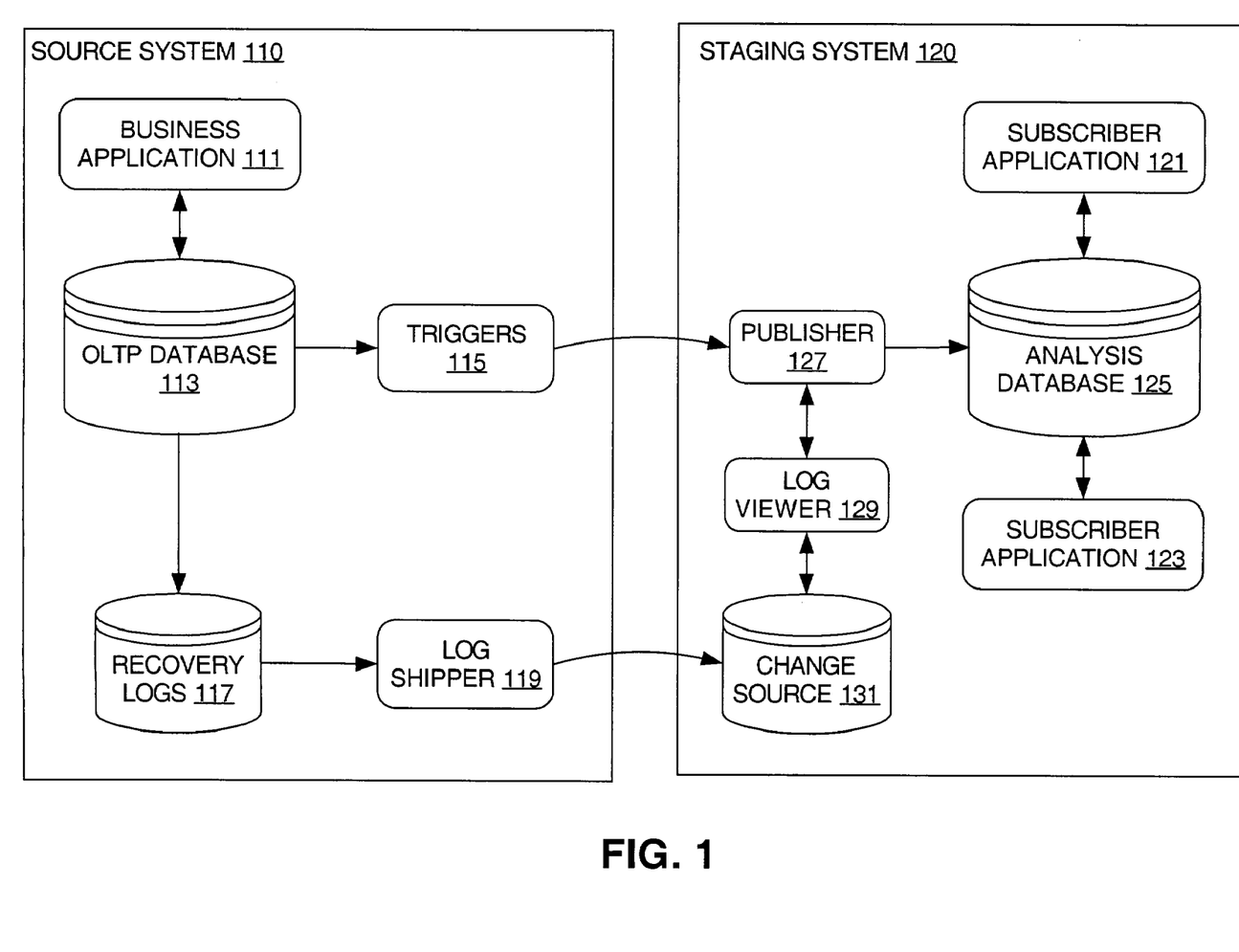
FIG. 1 is a high-level architectural diagram of one embodiment of the present invention.

FIG. 1 depicts the architecture of one embodiment of the present invention comprising a source system 110 and a staging system 120. The source system 110 is typically an on-line transaction processing (OLTP) for executing and keeping track of transactions for a business. For example, the source system 110 hosts a business application 111 that is responsible for interacting with employees or customers of the business. In response to commands and queries from the user of the business application 111, the business application 111 interacts with an OLTP database 113 for storing and retrieving data.

Functioning as the data warehouse in this example, the staging system 120 hosts one or more subscriber applications 121, 123. Without loss of generality, two subscriber applications 121, 123 are depicted, although any number may be created during the course of operation of an embodiment of the present invention. The subscriber applications 121, 123 are responsible for aggregating and analyzing the change data that has been extracted from the OLTP database 113, transported to the staging system 120, and loaded into the analysis database 125. Preferably, one of two mechanisms are employed to extract data from the OLTP database 113 without using flat files. These mechanisms are termed "synchronous extraction" and "asynchronous extraction," respectively.

In the synchronous extraction mechanism, triggers 115 are employed to capture each change to the OLTP database 113 when the changes are made and transport the changes to the staging system 120. At the staging system 120, these changes are then integrated and loaded into change tables (not shown) of the analysis database 125 by a publisher process 127. The synchronous extraction mechanism is described in greater detail in the commonly assigned, co-pending U.S. patent application Ser. No. 09/863,422 entitled SYNCHRONOUS CHANGE DATA CAPTURE IN A DATABASE SYSTEM filed on May 24, 2001 by William D. Norcott, the contents of which are hereby incorporated by reference.

For the asynchronous extraction mechanism, which is described in greater detail herein below, a log shipper 119 periodically copies recovery logs 117 that are produced by the OLTP database 113 in the normal course of operation. The recovery logs 117 contain all the changes that have been applied to the OLTP database 113 and are used for backing up the data in the OLTP database 113 and restoring the data in case of a system crash. The log shipper 119 copies the recovery logs 117 to an area of the staging system 120 called a change source 131, which can be implemented as an operating system directory. The publisher 127 interacts with a log viewer process 129 to obtain the change data from the shipped recovery logs in the change source 129 without having to be aware of the internal implementation details of the recovery logs. The publisher 127 then loads the change data obtained via the log viewer process 129 into the change tables in the analysis database 125 for use by the subscriber applications 121, 123. The interaction of the subscriber applications 121, 123 with the change tables is described in the commonly assigned, co-pending U.S. patent application Ser. No. 10/140, 818 entitled METHOD AND APPARATUS FOR CHANGE DATA CAPTURE filed on May 9, 2002 by William D. Norcott et al., the contents of which are hereby incorporated by reference.

Objects for Managing Change Data

In accordance with one aspect of the present invention, the change data extracted from the OLTP database 113 is maintained not in a flat file but in one or more database objects, referred to herein as "change tables" under control of a database management system, e.g. analysis database 123. Because the database management system provides such features as crash recovery for security and indexing for performance, use of database objects to hold the change data advantageously attains these beneficial features, without additional programming as compared to use of flat files.

Figure 2:
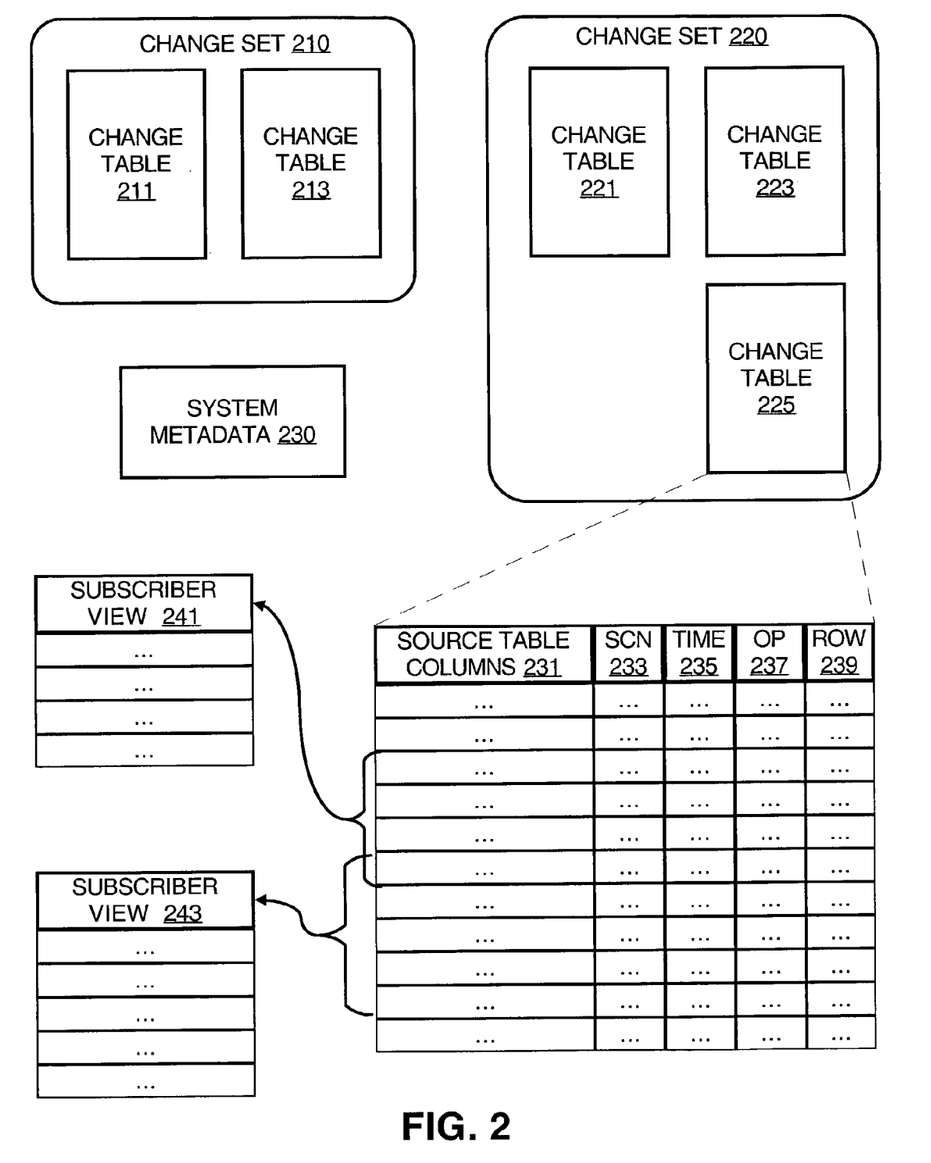
FIG. 2 is a schematic diagram depicting change objects in accordance with one embodiment of the present invention.

Referring to FIG. 2 by way of example, each source table or database object on the OLTP database 113 that is subject to change data capture is associated with a corresponding change table 211, 213, 221, 223, 225 in the analysis database 123. For transactional consistency, change tables 211, 213, 221, 223, 225 are grouped into sets of one or more "change sets" 210, 220 such that the publisher 125 ensures that all new change data added to the change tables in the same change set (e.g. changes tables 211, 213 of change set 210) are added at the same time, e.g. the modifications to these changes tables are performed in the same transaction and committed. In the example depicted in FIG. 2, there are two change sets, change set 210 and change set 220. Change set 210 comprises change table 211 and change table 213, which correspond to respective tables (not shown) on the OLTP database 113. Likewise, change set 220 comprises change table 221, change table 223, and change table 225, which also correspond to respective tables (not shown) on the OLTP database 113. The information that defines the structure of the change sets 210, 220 and change tables 211, 213, 221, 223, 225 is maintained in system metadata 230.

Each change table employs a number of control columns in addition to the source table columns whose values were extracted, transported, and loaded from columns of the corresponding source table in the OLTP database 113. In the example of FIG. 2, change table 225 is depicted as having a set of source table columns 231 and control columns SCN 233, TIME 235, OP 237, and ROW 239. The source table columns 231 may include all or a subset of the columns in the corresponding source table. In various implementations, the control columns may be part of the same database object that contains the source table columns or part of parallel, associated database object, which can be joined with source table columns (e.g. by a row identifier or a primary key).

The control columns SCN 233, TIME 235, OP 237, and ROW 239 preferably have reserved names that customers are not allowed to use for their own columns, for example, names with a reserved character such as a dollar sign ($). The reserved names, of course, can be any valid string and, in this example, are named SCN 233, TIME 235, OP 237, and ROW 239 for mnemonic reasons.

The SCN 233 column holds the System Change Number of the commit for the transaction on the OLTP database 113 that gave rise to the change data. A system change number is a monotonically increasing number that identifies every operation performed on a database system, e.g. update, insert, delete, and commit, that can be used to order the operations performed in the database system. The present invention is not limited to any particular implement of system change numbers, and the concepts disclosed herein may be profitably employed with timestamps, incrementing serial numbers, and the like.

The TIME 235 column contains the commit time of the transaction that gave rise to the change data. This column helps subscriber applications 121 select or view change data that occurs in particular periods of time.

The OP 237 column contains a code indicating the type of operation that resulted in the change data. For example, if the OP 237 column contains the symbol 'I', then the operation was an insert operation and the change data in the source table columns 231 contains the data that was inserted. If the OP 237 column contains the symbol 'D', then the operation was a delete operation and the change data in the source table columns 231 contains the data that was deleted (this allows the summaries to be properly readjusted by the subscriber applications 121). If the OP 237 column contains the symbol 'UO', then the operation was an update operation and the change data in the source table columns 231 contains the old data that was modified; likewise, if the OP 237 column contains the symbol 'UN', then the operation was an update operation and the change data in the source table columns 231 contains the new data that was modified. Thus, update operations on the source table result in two entries in the change table, one for the old data and another for the new data, so the subscriber applications 121 have sufficient information to readjust their summaries of the OLTP data. Under certain circumstances, the source table may include "large objects" (LOB) such as graphics and pictures. This LOB is typically not summarized, so, to save memory, only the new LOB is recorded in the change table (with the symbol 'UL' in the OP 237 column). These symbols in the OP 237 column ('I', 'D', 'UO', 'UN',
'UL') are chosen for mnemonic reasons and other symbols can be arbitrarily assigned any unique value without departing from the purview of the present invention (e.g. numbers).

The ROW 239 column contains a unique row sequence number for the changes in the change table. This column helps subscriber applications 121 order the operations that have been committed in the same transaction. Also, both the record for the old updated values (OP 237 column with 'UO') and the record for the new updated values (OP 237 column with 'UN') of the same operation will have the same row sequence number, because these two records are for the same change operation on the OLTP database 113 (an update operation).

Although not depicted in FIG. 2, additional control columns may be provided to facilitate the implementation of embodiments of the present invention. For example, a bit mask of the updated columns can be used to identify quickly which columns have changed. As another example, the name of user who cause the operation can be recorded in a control column. The row identifier of the affected row in the source table can also be included in a control column.

The subscriber applications 121, 123 of FIG. 1, however, need not see all the contents of the change tables. In particular, the range of rows that the subscriber application 121, 123 sees in the respective subscriber view is restricted and carefully controlled, as explained in detail below, so that change data is not lost nor double counted for subscriber applications 121, 123. In the example of FIG. 2, two subscriber views 241, 243 are depicted although any number of subscriber views may be created during the operation of an embodiment of the present invention. Use of the subscriber views 241, 243 beneficially insulates the respective subscriber applications 121, 123 from the implementation details of the change table 225. Unlike some prior art approaches, it is not necessary to add any control columns or information to the source tables themselves on the OLTP database 113; the provision of control columns for the change tables on the analysis 120 suffices. Consequently, this feature allows change data capture to be performed without changing the schema of the OLTP database 113, which is desirable for many turn-key OLTP databases.

High-Performance Change Data Cap

Figure 3:
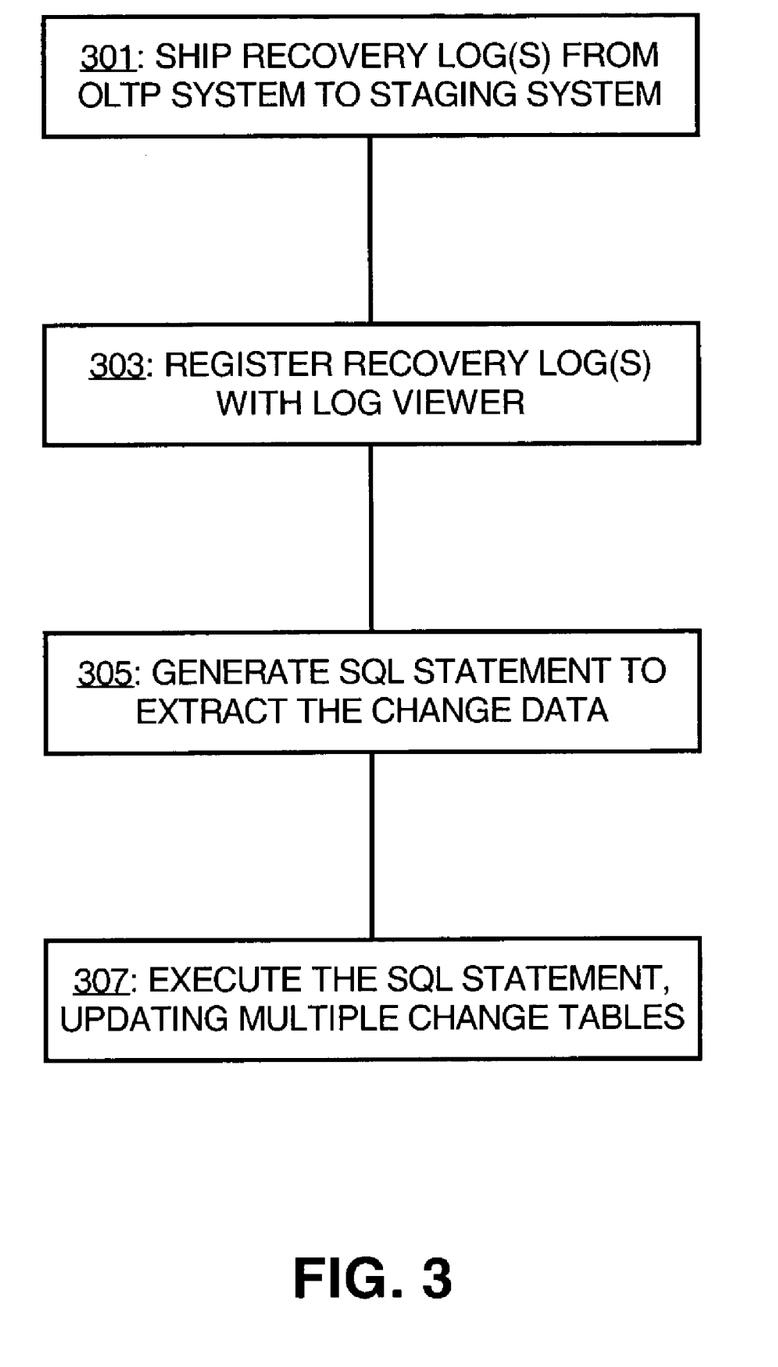
FIG. 3 is a flowchart that illustrates high-performance change data capture for an embodiment of the present invention.

Referring to FIG. 3, at step 301, the recovery logs 117 are shipped from the source system 110 to a location on the staging system 120 called a change source 131, which can be an operating system directory. Also known as a "redo log," a recovery log 117 is produced by the OLTP database system 113 in the normal course of operation to allow users to undo transactions (e.g. in a transaction rollback) and to provide for recovery after a system crash. Recovery logs 117 thus provide a way to cancel to abort a transaction before the transaction is committed, and recovery logs 117 are a standard feature of relational database management systems. One way to implement the log shipper 119 is described in the commonly assigned, co-pending U.S. patent application Ser. No. 09/852, 008 entitled DISASTER RECOVERY WITH BOUNDED DATA LOSS filed on May 10, 2001 by Mahesh Girkar et al., the contents of which are hereby incorporated by reference.

Some database management systems provide a log viewer 129 to allow the user to extract data from recovery logs 117 for auditing or reporting. When used for this purpose, the recovery logs 117 constitute an audit trail of the changes that have been previously made to the OLTP database 113. In accordance with one embodiment of the invention, at step 303 the shipped recovery logs 117 in the change source 131 are registered with the log viewer 129 to permit information to be extracted from the shipped recovery logs 117, not just for purposes of auditing as previously used but for change data capture. Use of a log viewer 129 advantageously encapsulates, hides, and insulates the implementation details of the recovery logs 117 from the publisher 127, thereby simplifying the design and maintenance of the publisher 127. Furthermore, the log viewer 129 permits the publisher 127 to extract data from recovery logs 117 that have been produced by a foreign database system, which has been developed by a different database vendor and employs a different, incompatible implementation of the internal data structures, file formats, and algorithms.

Preferably, the log viewer 129 is configured to provide a relational database interface to the data in the recovery logs 117 so that the publisher 127 can obtain the change data by executing a SQL select statement. For the purpose of the following discussion, the relational database interface is mediated through a relational view on the recovery logs 117 called VIEWER, which contains at least the following columns: TABLE_VIEWED, which contains the name of the source table from which change data is to be extracted, and SCN, which contains the system change number of each of the transactions in the recovery logs 117. A system change number is a monotonically increasing number used to unique identify operations performed on the OLTP database 113. Furthermore, a SQL function, EXTRACT ( ), is provided to extract data from a particular column from the recovery log 117. The EXTRACT ( ) is passed the name of the column whose data is to be returned.

At step 305, a structured query language (SQL) is generated to extract the change data from the recovery logs 117 in a single via the relational database interface provided by the log viewer 129 and insert the extracted change data into multiple change tables. The multiple change tables may be part of a change set, which is a logical group of related change tables that are to be kept transactionally consistent. Accordingly, a transaction to update the change tables is begun for all the change tables in the change set and is committed at the end of this process to ensure that all the changes to related change table will become visible to the subscriber applications 121, 123 at the same time.

In one implementation the generated SQL statement is a multi-table insert statement of the following form:

```
INSERT /*PARALLEL*/ ALL
WHEN DATA_OBJ#=obj_id1 THEN
    INTO ct1 (control_columns, change_columns1)
    VALUES (control_columns, aliased_columns1)
WHEN DATA_OBJ#=obj_id2 THEN
    INTO ct2 (control_columns change_columns2)
    VALUES (control_columns aliased_columns2)
SELECT DATA_OBJ#, control_defs, aliased_column_defs
FROM VIEWER
WHERE SCN > ft AND SCN <= 1t
    AND DATA_OBJ# IN (obj_id1, obj_id2)
```

As indicated by the structure of the SQL statement, the statement specifies a multi-table insert, in which there is a single SELECT clause that specifies the extraction of data from the recovery log via a relational interface and multiple WHEN ... THEN clauses for each change tables, in which the change data is inserted. Although this example shows the use of a multi-table insert with two change tables, the present invention is not so limited and this statement can be expanded to cover any enumerable number of change table tables adding additional WHEN ... THEN clauses before the SELECT clause and adding additional object identifiers in the IN predicate of the WHERE clause.

In this SQL statement, "/*+PARALLEL*/" is a hint to have the data inserted into all data partitions of the multiple change tables concurrently, although much the performance benefits of the present invention is attainable without this hint. Furthermore, "VIEWER" is the name of the relational view that the log viewer 129 presents to the publisher as a relational interface; and "SCN" is a column that identifies the transaction that resulted in the change data. The remaining slots of the SQL statement, which are set in italics, are explained with respect to a working example as follows.

The obj_id1 and obj_id2 slots hold the object names that correspond to the two change tables serviced by the SQL statement and are indicated in the recover log 117. The ct1 and ct2 slots hold the schema names of the two respective change tables.

The slot "control_columns" in the WHEN ... THEN clauses is a list of control columns that are to be inserted into each change table, e.g. SCN 233, TIME 235, OP 237, and ROW 239. The slot labeled "change_columns1" is a list of the names of the visible columns in the change table ct1 that correspond to the columns in a first source table, e.g. source table columns 231, while the "aliased_columns1" slot holds disambiguated column names of the change table ct1. Likewise, the slot labeled "change_columns2" is a list of the names of the visible columns in the change table ct2 that correspond to the columns in a second source table, and the "aliased_columns2" slot holds disambiguated column names of the change table ct2. The purpose of the "aliased_columns1" and "aliased_columns2" slots is to handle the case where change tables ct1 and ct2 have columns with the same name.

The "control_defs" slot in the SELECT clause is a list of the definition of the values for the control columns that are to be inserted into each change table, e.g. SCN 233, TIME 235, OP 237, and ROW 239. The values of these columns are obtained from the recovery log 117 and presented by the log viewer 129 as columns in a relational manner. The "aliased_defs" slot is a list of the definition of the visible columns of all the change tables serviced by the SQL statement. In one implementation, the values of these columns are obtained from the log viewer 129 by a function call of the log viewer using the name of the column in the source table as a parameter. Each column is aliased to disambiguate among other columns in the change set, for example, by prepending the object name that corresponds to the particular change table.

The slot "ft" holds the transaction identifier of the first change record for the current change table, in which the transaction identifier is either a unique, monotonically increasing transaction number or a system change number. Similarly, the slot "1t" is the transaction identifier of the last change record for the current change table. In this example, the "ft" slot may have a value of 1001 for the first transaction, and the "1t" slot may have a value of 9009 for the last transaction.

At step 307, the generated SQL statement is executed, thereby fetching the change data from the shipped recovery logs 117 via the log viewer 129 and update the corresponding change tables. The multi-table "INSERT ... SELECT" statement can be optimized by the analysis database 125 when its native language is SQL. As a result, the analysis database 125 can take advantage of the indexing, partitioning, and parallel features of the analysis database 125. Furthermore, use of standard SQL for this operation benefits from the data integrity and transactional capability that is the hallmark of a modern relational database management system. For example, the multi-table "INSERT . . . SELECT" statement can be made part of a single transaction per change set, to that the entire data loading operation executes as a single transaction. This approach addresses data integrity or recovery problems that characterize the conventional flat file approach that would arrive, for example, if all but one columns successfully loaded, impacting transactional consistency.

Figure 4:
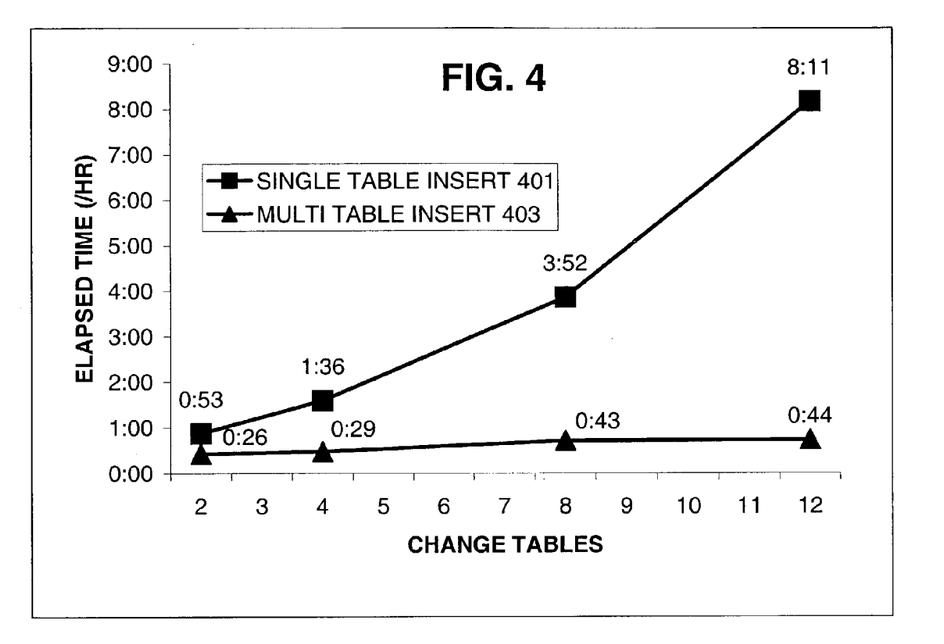
FIG. 4 is a graph illustrating elapsed times of processing recovery logs for change tables using single-table insert statements and multi-table insert statements in accordance with an embodiment.
Figure 5:
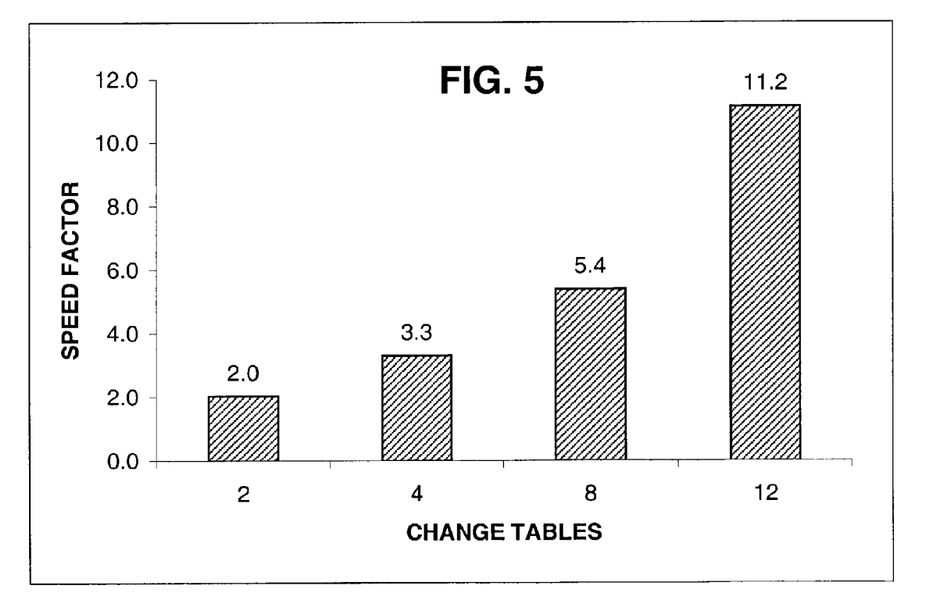
FIG. 5 is a bar graph showing relative performance of multi-table insert statements over single-table insert statements and statements in accordance with an embodiment

FIG. 4 and 5 illustrate the unexpected performance enhancements by one multi-insert implementation 403 with respect to a single-insert implementation 401. In FIG. 4, the elapsed times of the single-insert implementation 401 range from 53 minutes for two change tables to 8 hours, 11 minutes, for 12 change tables. These times are consistently and increasingly longer than the respective elapsed times for the multi-insert implementation 403, which range from 26 minutes for two change tables 44 minutes for 12 change tables. FIG. 5 shows the performance factors for runs with 2, 4, 8, and 12 change tables of the multi-insert implementation over single-insert implementation, with speed-ups of 2.0, 3.3, 5.4, and 11.2 respectively.

Hardware Overview

Figure 6:
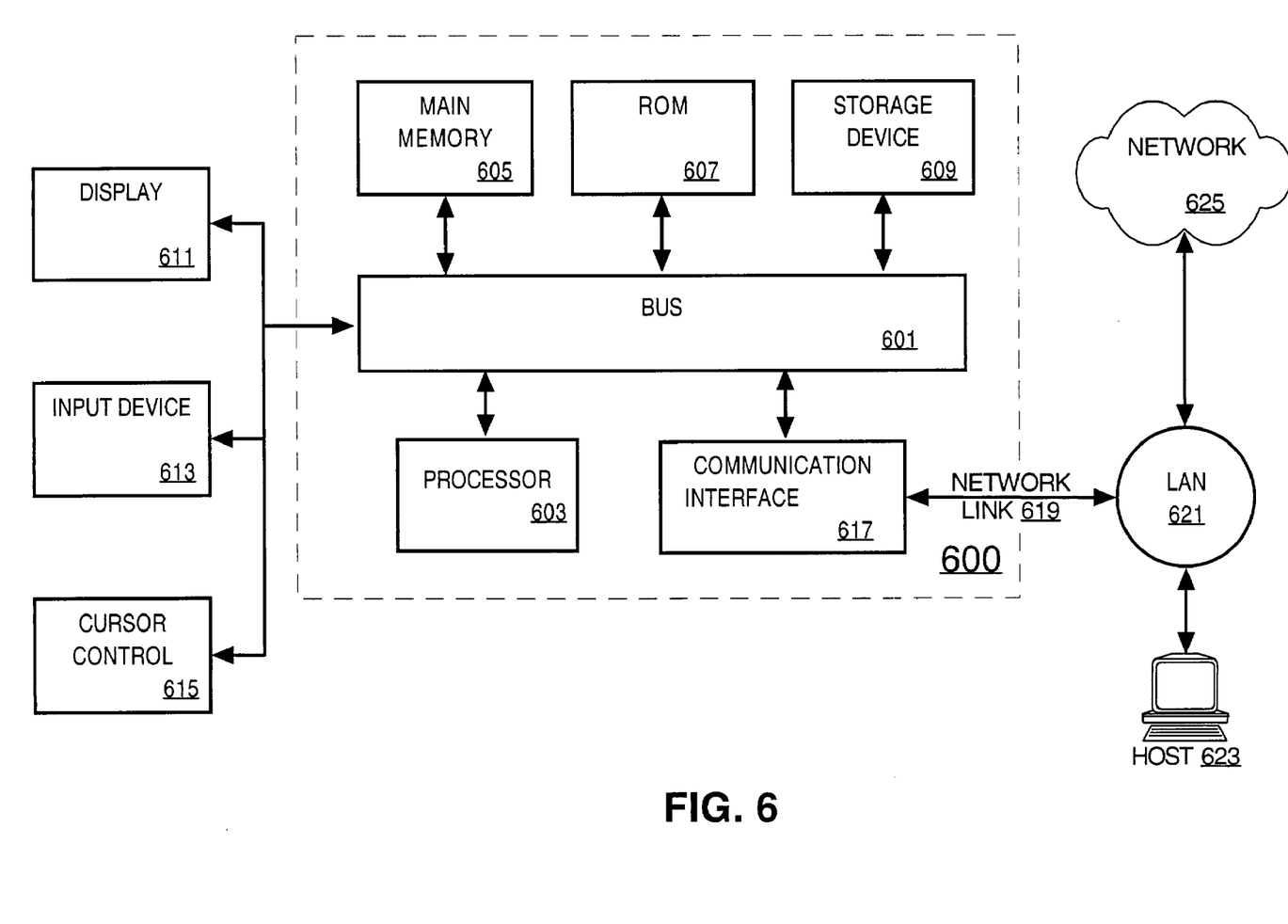
FIG. 6 depicts a computer system that can be used to implement an embodiment of the present invention.

FIG. 6 illustrates a computer system 600 upon which an embodiment according to the present invention can be implemented. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, high-performance change capture is provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 605 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. A method for change data capture, comprising the steps of:
    copying a recovery log of a first system to a first object in a second system;
    storing the recovery log;
    obtaining change data from the recovery log stored in the first object based in-part on a column in the recovery log that holds data representing when a transaction has been committed;
    generating a SQL single multi-table insert statement to obtain the change data in a single transaction from a recovery log;
    grouping a plurality of change tables in a database of the second system into at least two groups of change tables; and
    executing an SQL statement wherein the SQL statement specifies inserting the change data into one of the at least two groups of change tables, where the change data is inserted into each of the change tables in the one of the at least two groups of change tables having a column corresponding to the column in the recovery log, and change data representing modifications that has been performed to a plurality of source tables in the database that correspond to the change table, wherein the obtaining and inserting is performed in a single transaction.

2. A method according to claim 1, wherein the modifications include a first update to a first column in a first source tables among the source tables and a second update to a second column in a second source tables among the source tables;
    and the first column and the second column have a same name.

3. A method according to claim 1, further comprising:
    generating a single database statement to obtain the change data from the recovery log and to insert the change data in the change tables in a single pass; and
    executing the single database statement to perform the steps of obtaining and inserting.

4. A computer-readable storage medium storing instructions for change data capture, said instructions arranged, when executed, to cause one or more processors to perform the steps of a method according to claim 1, wherein the computer-readable medium is any one of a volatile memory and non-volatile memory.

5. A method of change data capture, comprising the steps of:
    generating a SQL single multi-table insert statement to obtain the change data in a single transaction from a recovery log;
    grouping a plurality of change tables in a database of the second system into at least two groups of change tables; and
    executing the SQL statement, thereby obtaining the change data from a recovery log copied from a first system to a first object in a second system based in-part on a column in the recovery log that holds data representing when a transaction has been committed and inserting the change data into one of the at least two groups of change tables, where the change data is inserted into each of the change tables in the one of the at least two groups of change tables concurrently, each change table in the one of the at least two groups of change tables having a column corresponding to the column in the recovery log, said change data representing modifications that has been performed to a plurality of source tables in the database that correspond to the change tables in the database, wherein the obtaining and inserting is performed in a single transaction.

6. A computer-readable storage medium storing instructions for change data capture, said instructions arranged, when executed, to cause one or more processors to perform the steps of a method according to claim 5, wherein the computer-readable medium is any one of a volatile memory and non-volatile memory.

7. A system for change data capture, the system comprising:
    A processor configured to execute computer program instructions; and
    A memory configured to store computer program instructions executable by the processor, for performing the steps of:
        copying a recovery log of a first system to a first object in a second system;
        storing the recovery log;
        obtaining change data from the recovery log stored in the first object based in-part on a column in the recovery log that holds data representing when a transaction has been committed;
        generating a SQL single multi-table insert statement to obtain the change data in a single transaction from a recovery log:
        grouping a plurality of change tables in a database of the second system into at least two groups of change tables; and executing an SQL statement wherein the SQL statement specifies inserting the change data into one of the at least two groups of change tables, where the change data is inserted into each of the change tables in the one of the at least two groups of change tables having a column corresponding to the column in the recovery log, and change data representing modifications that has been performed to a plurality of source tables in the database that correspond to the change table, wherein the obtaining and inserting is performed in a single transaction.

8. A system for change data capture, the system comprising:
 a processor operable to execute computer program instructions; and
 a memory operable to store computer program instructions executable by the processor, for performing the steps of:
 generating a SQL single multi-table insert statement to obtain the change data in a single transaction from a recovery log;
 grouping a plurality of change tables in a database of the second system into at least two groups of change tables; and
 executing the SQL statement, thereby obtaining the change data from a recovery log copied from a first system to a first object in a second system based in-part on a column in the recovery log that holds data representing when a transaction has been committed and inserting the change data into one of the at least two groups of change table, where the change data is inserted into each of the change tables in the one of the at least two groups of change tables concurrently, each change table in the one of the at least two groups of change tables having a column corresponding to the column in the recovery log, said change data representing modifications that has been performed to a plurality of source tables in the database that correspond to the change tables, wherein the obtaining and inserting is performed in a single transaction.

* * * * *

UNITED STATES PATENT AND TRADEMARK OFFICE
CERTIFICATE OF CORRECTION

PATENT NO. : 7,647,354 B2  Page 1 of 1
APPLICATION NO. : 10/435703
DATED : January 12, 2010
INVENTOR(S) : William D. Norcott It is certified that error appears in the above-identified patent and that said Letters Patent is hereby corrected as shown below:

On Title page 2, in column 2, Item [56] under "Other Publications", line 3, delete "Warehouseing" and insert -- Warehousing --, therefor.

In column 3, line 10, after "embodiment" insert -- . --.

In column 11, line 60, in claim 1, after "tables" insert -- concurrently, each change table in the one of the at least two groups of change tables --.

In column 11, line 61, in claim 1, delete "and" and insert -- said --, therefor.

In column 11, line 64, in claim 1, delete "table," and insert -- tables, --, therefor.

In column 12, line 39, in claim 5, after "tables" delete "in the database".

In column 12, line 50, in claim 7, delete "A" and insert -- a --, therefor.

In column 12, line 52, in claim 7, delete "A" and insert -- a --, therefor.

In column 12, line 64, in claim 7, delete "log:" and insert -- log; --, therefor.

In column 13, line 5, in claim 7, after "tables" insert -- concurrently, each change table in the one of the at least two groups of change tables --.

In column 13, line 7, in claim 7, delete "and" and insert -- said --, therefor.

In column 13, line 9, in claim 7, delete "table," and insert -- tables, --, therefor.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,647,354 B2 | Page 1 of 1 |
| APPLICATION NO. | : 10/435703 | |
| DATED | : January 12, 2010 | |
| INVENTOR(S) | : William D. Norcott | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this

Sixteenth Day of November, 2010

David J. Kappos
*Director of the United States Patent and Trademark Office*